United States Patent [19]

Makhlouf et al.

[11] 4,180,619

[45] Dec. 25, 1979

[54] CROSSLINKED ACRYLIC POLYMER MICROPARTICLES

[75] Inventors: Joseph M. Makhlouf, Mars; Samuel Porter, Jr., Tarentum, both of Pa.

[73] Assignee: PPG Industries, Inc., Pittsburgh, Pa.

[21] Appl. No.: 934,109

[22] Filed: Aug. 16, 1978

Related U.S. Application Data

[60] Division of Ser. No. 805,679, Jun. 13, 1977, which is a continuation-in-part of Ser. No. 559,949, Mar. 19, 1975, abandoned.

[51] Int. Cl.$^2$ .......................................... C08F 220/06
[52] U.S. Cl. ...................................... 526/202; 526/201; 526/203; 526/273; 528/26; 528/27; 528/32
[58] Field of Search .............. 526/201, 202, 203, 273; 528/26, 27, 32; 428/402

[56] References Cited

U.S. PATENT DOCUMENTS

| | | | |
|---|---|---|---|
| 3,317,635 | 5/1967 | Osmond et al. | 260/836 |
| 3,702,836 | 11/1972 | Walbridge | 260/836 |
| 3,720,534 | 3/1973 | Macaulay et al. | 526/202 |

*Primary Examiner*—Harry Wong, Jr.
*Attorney, Agent, or Firm*—George D. Morris

[57] ABSTRACT

Crosslinked acrylic polymer microparticles having a particle size of from 0.1 to 10 microns are produced in relatively high concentrations by a method comprising the free radical addition copolymerization of at least one monoethylenically unsaturated monomer with alpha, beta-ethylenically unsaturated monocarboxylic acid and crosslinking monomer selected from the group consisting of (1) epoxy group-containing compound and (2) a mixture of alkylenimine and organoalkoxysilane in the presence of a dispersion stabilizer and an aliphatic hydrocarbon dispersing liquid in which the crosslinked polymer particles are insoluble.

The crosslinked acrylic polymer microparticles are useful as additives to protective and decorative coatings.

12 Claims, No Drawings

CROSSLINKED ACRYLIC POLYMER MICROPARTICLES

CROSS-REFERENCE TO RELATED APPLICATION

This application is a division of application Ser. No. 805,679, filed June 13, 1977, which is a continuation-in-part of application Ser. No. 559,949, filed Mar. 19, 1975, now abandoned.

BACKGROUND OF THE INVENTION

Methods of preparing crosslinked acrylic polymer microparticles commonly referred to as microgel particles are known in the art. One such method is disclosed in commonly-assigned copending application Ser. No. 296,700, filed Oct. 11, 1972, now U.S. Pat. No. 3,880,796, in the name of Roger M. Christenson et al. In this method, a non-aqueous polymer dispersion is prepared by polymerizing an ethylenically unsaturated monomer containing hydroxyl groups in the presence of (1) a dispersing liquid which is a solvent for the monomer but in which the resultant polymer is insoluble and (2) a dispersion stabilizer. The resultant non-aqueous polymer dispersion produced by this method consists of a major proportion of uncrosslinked acrylic polymer particles and a minor proportion (e.g., 10 percent by weight or less) of crosslinked acrylic polymer particles (i.e., microgel particles). Accordingly, in this method, it is necessary to separate the microgel particles from the uncrosslinked polymer particles. This is accomplished by the addition to the dispersion of an active solvent for the uncrosslinked polymer particles, thereby converting the dispersion to essentially a solution, but for the presence of the insoluble microgel particles. The microgel particles are then separated from the bulk of the polymer by conventional means such as centrifuging, filtering, and the like.

The above process, while advantageous in some respects, has several serious disadvantages. Thus, as will be apparent, the microgel particles are an incidental by-product of the non-aqueous dispersion process and therefore the yield is relatively low (e.g., 5 to 10 percent by weight or less). Moreover, because of this factor, it is necessary to separate the microgel particles from a dispersion which contains a major proportion of uncrosslinked acrylic polymer particles by dissolving the uncrosslinked polymer particles with an active solvent.

Still another method for producing microgel particles is disclosed in British Patent No. 967,051 to Bullitt et al, dated Aug. 19, 1964. In this method, microgel particles are prepared by forming an aqueous emulsion of monoethylenic unsaturated monomer and a crosslinking monomer containing at least two ethylenic double bonds, heating the emulsion to a temperature of about 40° to 100° C. until the reaction is substantially complete to yield a microgel and during the reaction adding an agent to inhibit the formation of high molecular weight substantially uncrosslinked material. The inhibiting agent as disclosed in Bullitt et al can be an active solvent for the monomers or a chain transfer agent. This method has several disadvantages. Thus, the method utilizes conventional emulsion polymerization techniques requiring careful control of the process to prevent settling and the like. Further, the use of crosslinking monomers containing at least 2 ethylenic double bonds (e.g., divinyl and diacrylate monomers) has been found to lead to flocculation problems in relatively high solids level (i.e., 40 percent by weight or higher) microgel particle dispersions. Finally, this method requires the additional step of adding a water-immiscible solvent or chain transfer agent to the reaction mixture.

BRIEF SUMMARY OF THE INVENTION

The method of the present invention overcomes essentially all of the disadvantages of the prior art. Thus, the present invention provides a method of producing crosslinked acrylic polymer microparticles in relatively high concentrations (i.e., solids levels of 20 to 60 percent by weight) by a process which comprises the free radical addition copolymerization of alpha, beta-ethylenically unsaturated monocarboxylic acid, at least one other copolymerizable monoethylenically unsaturated monomer and crosslinking monomer selected from the group consisting of (1) epoxy group-containing compound and (2) a mixture of alkylenimine and organoalkoxysilane in the presence of a polymeric dispersion stabilizer and dispersing liquid in which the crosslinked acrylic polymer particles are insoluble. The reaction is carried out at elevated temperatures such that the dispersion polymer first forms and then is crosslinked; usually the temperature should be between about 50° C. and 150° C.

DESCRIPTION OF THE PREFERRED EMBODIMENTS

Examples of alpha, beta-ethylenically unsaturated monocarboxylic acid which may be used are acrylic acid, methacrylic acid, ethacrylic acid, alpha-chloroacrylic acid, crotonic acid isocrotonic acid, tiglic acid and angelic acid. The preferred alpha, beta-ethylenically unsaturated monocarboxylic acids are acrylic acid and methacrylic acid. Methacrylic acid is especially preferred. The amount of alpha, beta-ethylenically unsaturated monocarboxylic acid employed in the process of the invention is usually in the range of from about 0.5 percent to about 15 percent by weight of the monomers used in the copolymerization process.

Various other monoethylenically unsaturated monomers may be copolymerized with the acid monomer in the process of this invention. Although essentially any copolymerizable monoethylenic monomer may be utilized, depending upon the properties desired, the preferred monoethylenically-unsaturated monomers are the alkyl esters of acrylic or methacrylic acid, particularly those having from about 1 to about 4 carbon atoms in the alkyl group. Illustrative of such compounds are the alkyl acrylates, such as methyl acrylate, ethyl acrylate, propyl acrylate, and butyl acrylate and the alkyl methacrylates, such as methyl methacrylate, ethyl methacrylate, propyl methacrylate and butyl methacrylate. Other ethylenically unsaturated monomers which may advantageously be employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile, and the like. From about 70 percent to about 99 percent by weight of such monoethylenically unsaturated monomers, based on the weight of monomer solids can be utilized.

As indicated above, the crosslinking monomer employed in the process of the invention is selected from the group consisting of (1) epoxy group-containing compound and (2) a mixture of alkylenimine and organoalkoxysilane.

A particularly preferred class of epoxy group-containing compounds which may be utilized in the practice of the invention are monoepoxide compounds which additionally contain ethylenic unsaturation. Illustrative of such preferred compounds are, for example, glycidyl acrylate and glycidyl methacrylate.

Various alkylenimines can be utilized in the practice of the invention including substituted alkylenimines. The preferred class of such amines are those of the formula:

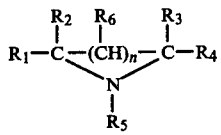

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; aralkyl, such as tolyl, xylyl or the like; or aralkyl, such as benzyl, phenethyl or the like. $R_6$ in the above formula is hydrogen or a lower alkyl radical usually having not more than about 6 carbon atoms, and n is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

A number of specific examples of alkylenimines within the class described are as follows:

Ethylenimine (aziridine)
1,2-propylenimine (2-methyl aziridine)
1,3-propylenimine (azetidine)
1,2-dodecylenimine (2-decyl aziridine)
1,1-dimethyl ethylanimine (2,2-dimethyl aziridine)
Phenyl ethylenimine (2-phenyl aziridine)
Benzyl ethylenimine (2-phenylmethyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl azetidine)
3-chloropropyl ethylenimine (2-(3-chloropropyl)aziridine)
Methoxyethyl ethylenimine (2-(2-methoxyethyl)aziridine)
Dodecyl aziridinyl formate (dodecyl 1-aziridinyl carboxylate)
N-ethyl ethylenimine (1-ethyl aziridine)
N-(2-aminoethyl)ethylenimine (1-(2-aminoethyl)aziridine)
N-(phenethyl)ethylenimine (1-(2-phenylethyl)aziridine)
N-(2-hydroxyethyl)ethylenimine (1-(2-hydroxyethyl)aziridine)
N-(cyanoethyl)ethylenimine (1-cyanoethyl aziridine)
N-phenyl ethylenimine (1-phenyl aziridine)
N-(p-chlorophenyl)ethylenimine (1-(4-chlorophenyl)aziridine)

Because of their availability and because they have been found to be among the most effective, the preferred imines are hydroxyalkyl-substituted alkylenimines, such as N-hydroxyethyl ethylenimine and N-hydroxyethyl propylenimine.

Organoalkoxysilane monomers which may advantageously be employed in the practice of this invention are the acrylatoalkoxysilanes, methacrylatoalkoxysilanes and the vinylalkoxysilanes. Illustrative of such compounds are acryloxypropyltrimethoxysilane, gamma-methacryloxypropyltrimethoxysilane, gamma-methacryloxypropyltriethoxysilane, gamma-methacryloxypropyl-tris(2-methoxyethoxy)silane, vinyltrimethoxysilane, vinyltriethoxysilane, vinyl-tris(2-methoxyethoxy)silane and the like. Of these organoalkoxysilanes, gamma-methacryloxypropyltrimethoxysilane is especially preferred.

The proportion of such crosslinking monomer employed in the process of the invention may range from 0.5 percent to 15 1 percent by weight of the monomers used in the copolymerization process. When the crosslinking monomer is a mixture of alkylenimine and organoalkoxysilane, the mole ratio of the alkylenimine to the alpha, beta-ethylenically unsaturated monocarboxylic acid used to prepare the polymer is generally in the range of from 0.5:1 to 1.5:1 and the mole ratio of the organoalkoxysilane to the alpha, beta-ethylenically unsaturated monocarboxylic acid used to prepare the polymer is generally in the range of from 1.5:1 to 3.5:1.

The monoethylenically-unsaturated monomer, acid monomer and crosslinking monomer are polymerized in a dispersing liquid which solubilizes the monomers but in which the resulting polymers are essentially not soluble and form dispersed polymer particles. The dispersing liquid is generally a hydrocarbon medium consisting essentially of liquid aliphatic hydrocarbons. A pure aliphatic hydrocarbon or a mixture of two or more may be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances, the amount of such non-aliphatic component may attain as high as 49 percent by weight of the entire dispersing liquid. However, the dispersing liquid preferably consists essentially of aliphatic hydrocarbons and, in general, the compositions of the present invention contain less than 25 percent by weight based on the weight of the dispersing liquid of an aromatic hydrocarbon and often none at all at this stage.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° C. up to about 235° C.

Examples of dispersing liquids useful herein are pentane, hexane, heptane, octane, mixtures of the same, and the like.

Ordinarily, the polymerizable composition of monomers and dispersing liquid should contain from about 30 to about 80 percent by weight of the dispersing liquid. It is understood, however, that the monomeric solution need contain only that amount of dispersing liquid necessary to solubilize the monomers and maintain the resulting polymers in a dispersed state after polymerization.

The monomers are polymerized in the presence of a dispersion stabilizer. The dispersion stabilizer employed in producing the microparticles of the invention is a compound, usually polymeric, which contains at least two segments of which one segment is solvated by the dispersing liquid and a second segment is of different polarity than the first segment and is relatively insoluble (compared to the first segment) in the dispersing liquid. Although such compounds have been used in the past to prepare dispersions of polymer, in those instances it has been considered necessary that the polymer produced be ungelled, film-forming and soluble in certain solvents.

Included among such dispersion stabilizers are polyacrylates and polymethacrylates, such as poly(lauryl)-methacrylate and poly(2-ethylhexylacrylate); diene polymers and coplymers such as polybutadiene and degraded rubbers; aminoplast resins, particularly highly naphtha-tolerant compounds such as melamine-formaldehyde resins etherified with higher alcohols (e.g., alcohols having 4 to 12 carbon atoms), for example, butanol, hexanol, 2-ethylhexanol, etc., and other aminoplasts of similar characteristics such as certain resins based on urea, benzoguanamine, and the like; and various copolymers designed to have the desired characteristics, for example, polyethylenevinyl acetate copolymers.

The presently preferred dispersion stabilizers used in this invention are graft copolymers comprising two types of polymer components of which one segment is solvated by the aliphatic hydrocarbon solvent and is usually not associated with polymerized particles of the polymerizable ethylenically unsaturated monomer and the second type is an anchor polymer of different polarity from the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The preferred dispersion stabilizers are comprised of two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reactions producing a polyester or polyether. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized, such as glycidyl acrylate or glycidyl methacrylate. The glycidyl group would react with the carboxyl group of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphtic hydrocarbons.

The preferred polymeric segment (A) of the dispersion stabilizer is formed by reacting poly-(12-hydroxystearic acid) with glycidyl methacrylate.

The second polymeric segment (B) of the dispersion stabilizer is of polarity different from the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic or methacrylic esters, such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically-unsaturated acids, such as acrylic acid, methacrylic acid, 3-butenoic acid, crotonic acid, itaconic acid, and others mentioned previously which contain pendant groups which are copolymerizable with the acrylic monomer.

The preferred polymeric segment (B) is a terpolymer of methyl methacrylate, glycidyl methacrylate, and methacylic acid.

The segments (A) and (B) are usually combined entities, the segment (A) being attached to the backbone of the graft copolymer and the segment (B) being carried in or on the backbone.

The monomer solution containing the stabilizer preferably contains from about 1 to about 25 percent by weight of the stabilizer. That is, the amount of dispersion stabilizer used is in the range of from about 1 to about 25 percent by weight based on the weight of monomers and dispersion stabilizer used in the copolymerization process.

The polymerization may be carried out in a conventional manner, utilizing heat and/or catalysts and varying solvents and techniques. Generally, a free radical catalyst such as cumene hydroperoxide, benzoyl peroxide or similar peroxygen compound, or an azo compound such as azobis(isobutyronitrile) is employed.

The resultant non-aqueous acrylic dispersion consists essentially of microgel particles (i.e., crosslinked acrylic polymer particles) dispersed therein. These particles have particle sizes ranging from 0.1 to 10 microns. Depending upon the original concentration of monomer solids, non-aqueous dispersions consisting essentially of the microgel particles can be produced by the process at relatively high concentrations. The term "relatively high concentration" as employed herein refers to the solids level of the non-aqueous dispersion. Thus, the process of this invention permits the production of non-aqueous dispersions of microgel particles having solids contents of from 20 to 60 percent by weight or even higher.

The following examples are submitted for the purpose of further illustrating the nature of the present invention and should not be interpreted as a limitation on the scope thereof. All parts and percentages in the examples as well as throughout the specification are by weight unless otherwise indicated.

EXAMPLE I

To a 5-liter flask equipped with an up-and-over condenser, agitator, thermometer, and heating mantle was charged 1900 grams of Napoleum 30 (a medium boiling naphtha from Kerr-McGee Company), 950 grams of hexane, and 950 grams of heptane. The mixture was heated to refux (about 85° C.) and then 200 grams of methyl methacrylate, 34 grams of a dispersion stabilizer solution and 14.3 grams of azobis(isobutyronitrile) were added. The dispersion stabilizer solution used contained 50.3 percent solids (viz., dispersion stabilizer) and the dispersion stabilizer was a polymer prepared by interpolymerizing 45.4 percent methyl methacrylate, 4.2 percent glycidyl methacrylate, 0.9 percent methacrylic acid, and 49.5 percent of a reaction product of 89.2 percent poly-12-hydroxystearic acid and 10.8 percent glycidyl methacrylate. The solvent of the dispersion stabilizer solution comprised 52.1 percent butyl acetate, 40.0 percent VM&P naphtha and 7.9 percent toluene. After this addition was complete, reflux was continued for about 20 minutes and then over a 3-hour period was added 4060 grams methyl methacrylate, 226 grams of gamma-methacryloxypropyltrimethoxysilane, 595 grams of the above dispersion stabilizer solution, 34.0 grams of methacrylic acid, 34.0 grams of 2-hydroxyethyl ethylenimine, 18.0 grams of azobis(isobutyronitrile) and 18 grams of p-octyl mercaptan. After this addition, reflux was continued for another 1.5 hours and the mixture was then cooled and filtered.

The resultant polymeric dispersion consisting essentially of crosslinked acrylic polymer particles (i.e., microgel particles) had a total solids content determined at 150° C. of 54.5 percent by weight.

EXAMPLE II

To a 5-liter flask equipped with an up and over condenser, agitator, thermometer and heating mantle were charged 1250 grams of heptane, 540 grams of Isopar H (a mixed aliphatic hydrocarbon having an initial boiling point of 350° F. and a dry point of 371° F. with 90 percent distilling between 353°–357° F., available from Humble Oil and Refining Company), 50 grams of methyl methacrylate, 10 grams of the dispersion stabilizer solution of Example I and 4 grams of azobis(isobutyronitrile). The mixture was heated to reflux (about 103° C.) and held for about 30 minutes. Then over a period of about 3 hours were added 1288 grams of methyl methacrylate, 70 grams of glycidyl methacrylate, 42 grams of methacrylic acid, 4.2 grams of Armeen DMCD (dimethyl cocoamine, available from Armour Chemical Company), 200 grams of the dispersion stabilizer solution of Example I, 14 grams of octyl mercaptan and 5.6 grams of azobis(isobutyronitrile). After this addition was completed, reflux was continued for an additional 30 minutes and then an additional 2.8 grams of azobis(isobutyronitrile) were added. Reflux was then continued for another one hour and the mixture was then cooled and filtered.

The resultant polymeric dispersion consisting essentially of crosslinked acrylic polymer particles (i.e., microgel particles) had a total solids content determined at 150° C. of 44.9 percent by weight.

According to the provisions of the Patent Statutes, there is described above the invention and what are now considered to be its best embodiments. However, within the scope of the appended claims, it is to be understood that the invention can be practiced otherwise than as specifically described.

We claim:

1. Crosslinked acrylic polymer microparticles having a particle size of from 0.1 to 10 microns, which crosslinked acrylic polymer particles may be produced by free radical addition copolymerizing from 0.5 to 15 percent of alpha, beta-ethylenically unsaturated monocarboxylic acid, from 70 to 99 percent of at least one other copolymerizable monoethylenically unsaturated monomer and from 0.5 to 15 percent of crosslinking monomer selected from the group consisting of (1) epoxy group-containing compound and (2) a mixture of alkylenimine and organoalkoxysilane, wherein:
   a. said epoxy group-containing compound is monoepoxide compound which additionally contains ethylenic unsaturation,
   b. said organoalkoxysilane is selected from the group consisting of acrylatoalkoxysilane, methacrylatoalkoxysilane and vinylalkoxysilane, and
   c. said monomer percentages are based on the weight of monomers used in the copolymerization process, in the presence of hydrocarbon dispersing liquid which is a solvent for the polymerizable monomers but a nonsolvent for the resultant polymer, and polymeric dispersion stabilizer containing at least two segments of which one segment is solvated by said dispersing liquid and a second segment is of different polarity than said first segment and is relatively insoluble in said dispersing liquid, wherein the reaction is carried out at elevated temperature such that the dispersion polymer first forms and then is crosslinked.

2. The crosslinked acrylic polymer microparticles of claim 1 wherein said alpha, beta-ethylenically unsaturated monocarboxylic acid is acrylic acid or methacrylic acid.

3. The crosslinked acrylic polymer microparticles of claim 1 wherein said other copolymerizable monoethylenically unsaturated monomer is an alkyl acrylate or alkyl methacrylate.

4. The crosslinked acrylic polymer microparticles of claim 1 wherein said other copolymerizable monoethylenically unsaturated monomer is methyl methacrylate.

5. The crosslinked acrylic polymer microparticles of claim 1 wherein said crosslinking monomer is a monoepoxide compound which additionally contains ethylenic unsaturation.

6. The crosslinked acrylic polymer microparticles of claim 5 wherein said monoepoxide compound which additionally contains ethylenic unsaturation is glycidyl methacrylate.

7. The crosslinked acrylic polymer microparticles of claim 1 wherein said crosslinking monomer is a mixture of alkylenimine and organoalkoxysilane selected from the group consisting of acrylatoalkoxysilane, methacrylatoalkoxysilane and vinylalkoxysilane.

8. The crosslinked acrylic polymer microparticles of claim 7 wherein said alkylenimine is hydroxyethyl ethylenimine and said organoalkoxysilane is gamma-methacryloxypropyltrimethoxysilane.

9. The crosslinked acrylic polymer microparticles of claim 7 wherein said polymer dispersion stabilizer is a graft copolymer containing two polymeric segments of which one segment is solvated by said dispersing liquid and the second segment is an anchor polymer of different polarity to said first segment and is relatively non-solvatable by said dispersing liquid and wherein said polymeric dispersion stabilizer contains pendant groups which are addition copolymerized with the ethylenically unsaturated monomers in the copolymerization process.

10. The crosslinked acrylic polymer microparticles of claim 9 wherein said polymeric dispersion stabilizer is formed by graft copolymerizing the reaction product of glycidyl methacrylate and poly-(12-hydroxystearic acid), with methyl methacrylate and glycidyl methacrylate and the resulting copolymer product containing pendent epoxy groups is reacted with methacrylic acid.

11. The crosslinked acrylic polymer microparticles of claim 9 wherein said other copolymerizable monoethylenically unsaturated monomer is methyl methacrylate, said alpha, beta-ethylenically unsaturated monocarboxylic acid is methacrylic acid, and said crosslinking monomer is a mixture of gamma-methcryloxypropyltrimethoxysilane and hydroxyethyl ethylenimine.

12. The crosslinked acrylic polymer microparticles of claim 5 wherein said other copolymerizable monoethylenically unsaturated monomer is methyl methacrylate, said alpha, beta-ethylenically unsaturated monocarboxylic acid is methacrylic acid and said crosslinking monomer is glycidyl methacrylate.

* * * * *